July 3, 1934.  C. A. GERLACH ET AL  1,965,181
SYSTEM OF ELECTRICAL DISTRIBUTION
Filed June 15, 1928  3 Sheets-Sheet 1
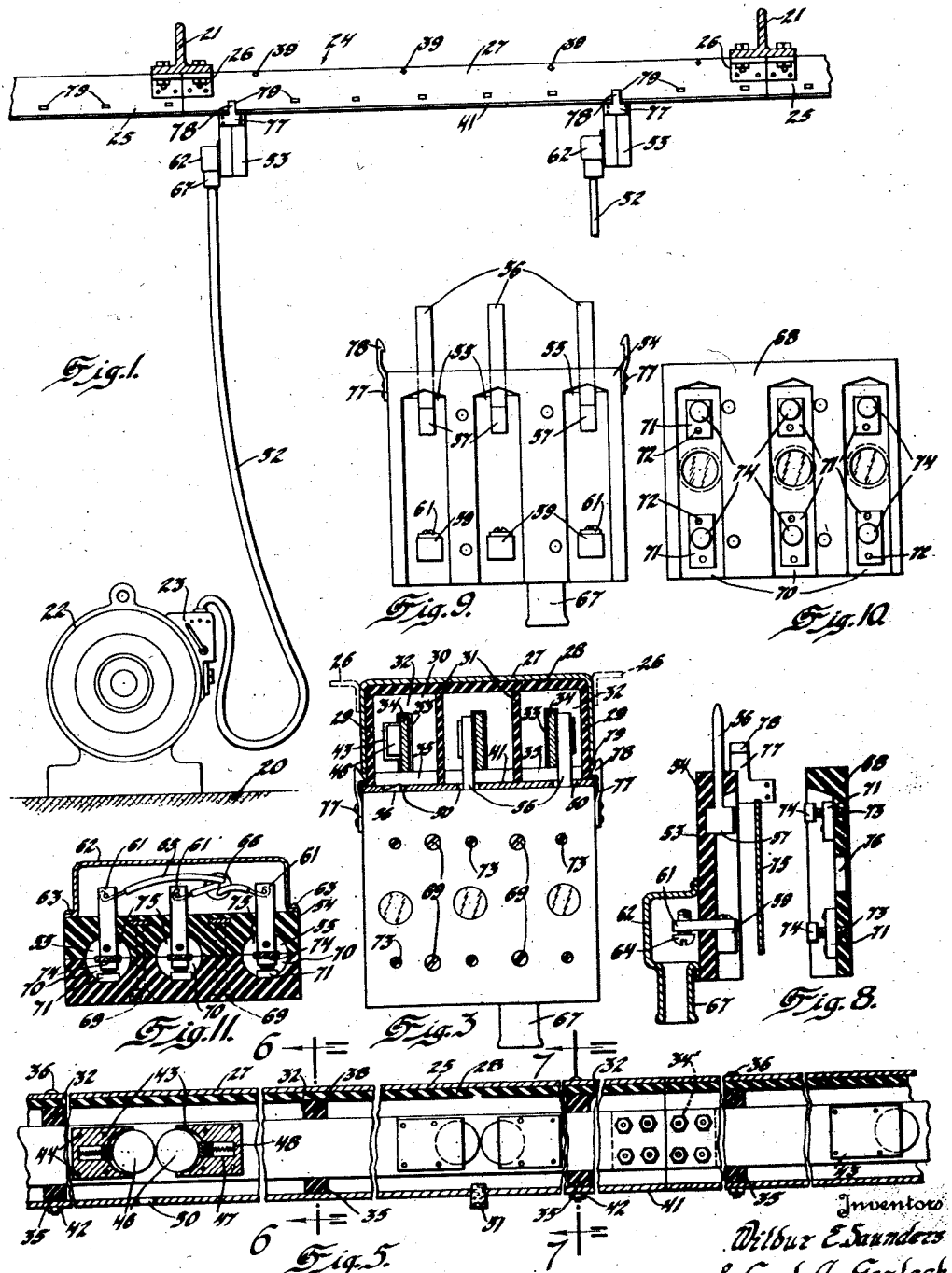
Inventors
Wilbur E. Saunders
& Carl A. Gerlach
By Blackmore, Spencer & Hush
Attorney

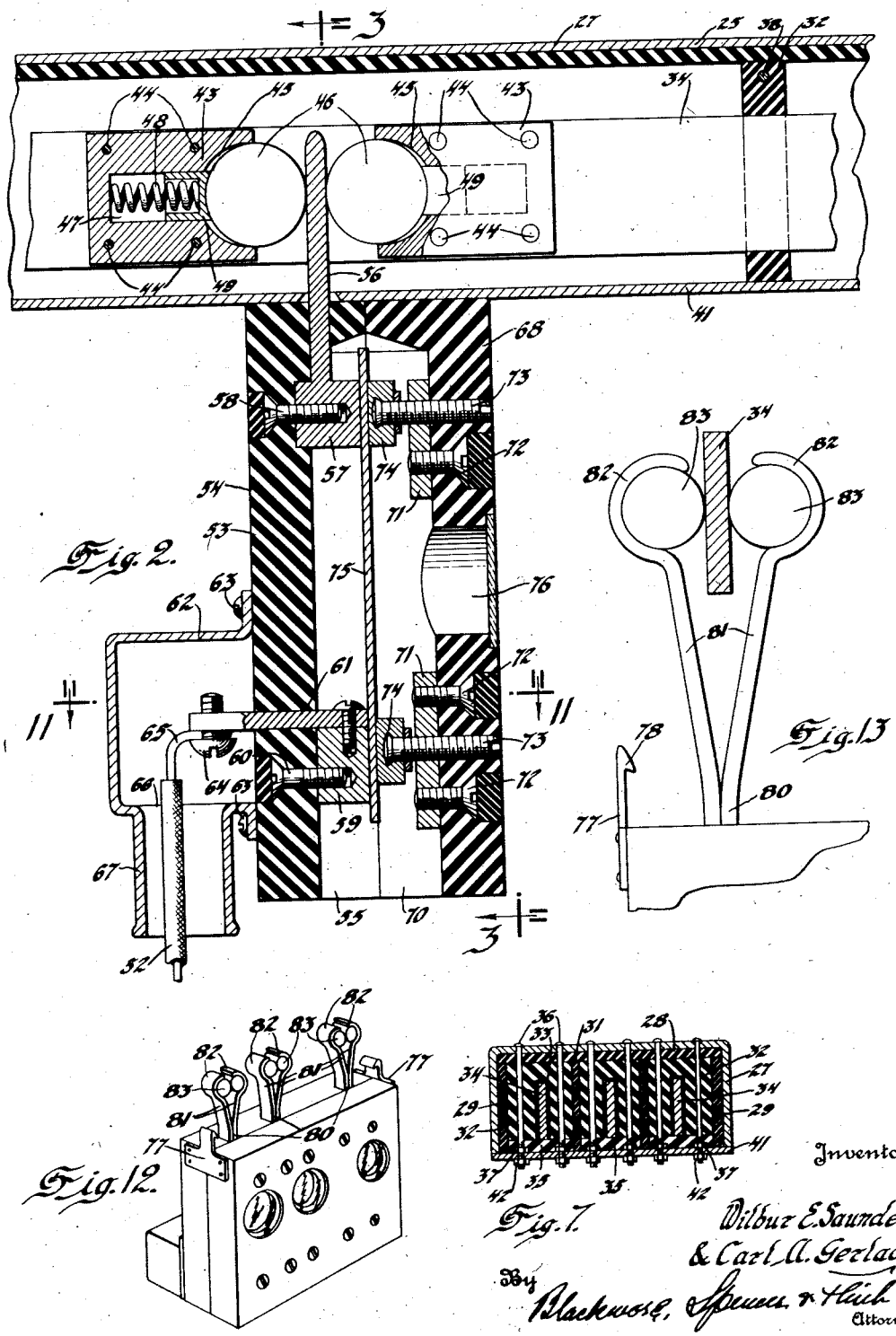

July 3, 1934.   C. A. GERLACH ET AL   1,965,181
SYSTEM OF ELECTRICAL DISTRIBUTION
Filed June 15, 1928   3 Sheets-Sheet 3
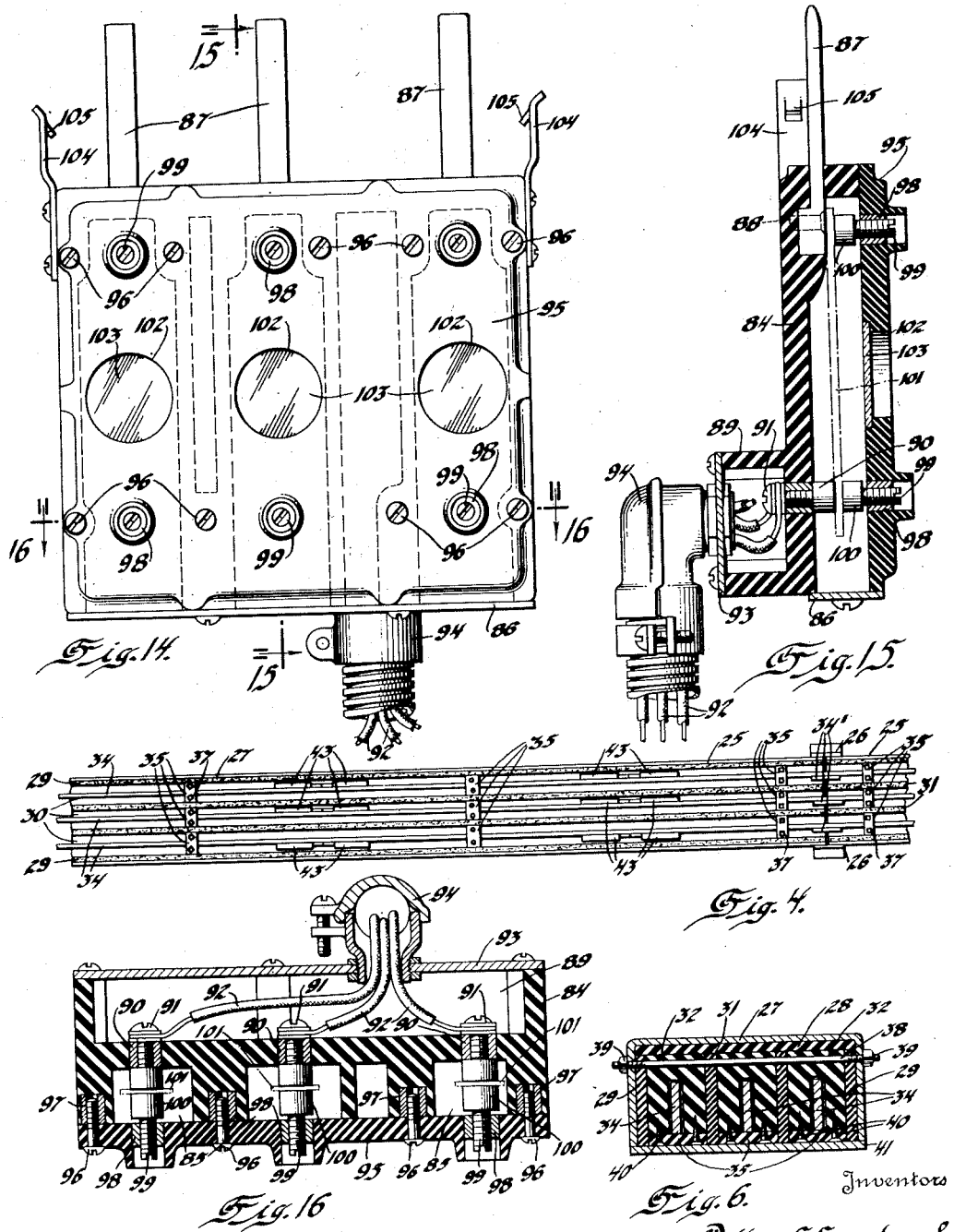

Patented July 3, 1934

1,965,181

UNITED STATES PATENT OFFICE 1,965,181

SYSTEM OF ELECTRICAL DISTRIBUTION

Carl A. Gerlach and Wilbur E. Sanders, Muncie, Ind.

Application June 15, 1928, Serial No. 285,686

20 Claims. (Cl. 247—3)

This invention relates to a system for the distribution of electric power.

In places, such, for instance, as machine shops or factories, where electricity is used as a source of power and there are a plurality of machines at different points on the floor of the building to be supplied with power each of which draws a heavy current when in operation, there are ordinarily provided main line conductors on the walls or ceilings of the building, an outlet box adjacent each machine to be supplied with power, and branch conductors leading from the main line conductors to each outlet box. Such a system of distribution of electric power is open to several objections among which may be mentioned lack of flexibility, by which we mean that if at any time it is desired to supply power to a machine at a distance from one of the outlet boxes, it is necessary to extend conductors from the nearest outlet box to the machine to be supplied or install another outlet box adjacent the machine, either of which operations requires the time and services of an electrican. It is an object of this invention to provide a system for the distribution of electric power in a building consisting of a conduit containing main line conductors extending along the walls or ceiling of the building and so constructed and arranged that branch conductors may be easily and quickly connected to or disconnected from the conductors within the conduit at a plurality of points throughout their length.

It is a further object of this invention to provide certain new and useful improvements in conduits for electric conductors.

It is another object of this invention to provide certain new and useful improvements in power take-off plugs.

In the accompanying drawings, there is shown apparatus whereby the foregoing and other objects of our invention are realized.

In the drawings:

Figure 1 is a fragmentary, more or less diagrammatic view of an installation in which is embodied our invention.

Figure 2 is an enlarged view, in section through the power take-off plug and a fragment of the conduit shown in Figure 1, showing the two parts operatively connected.

Figure 3 is a view taken on substantially the line 3—3 of Figure 2.

Figure 4 is a fragmentary bottom plan view of the conduit shown in Figures 1, 2 and 3 with the cover removed.

Figure 5 is a longitudinal section through the conduit.

Figures 6 and 7 are transverse sections through the conduit taken, respectively, on the lines 6—6 and 7—7 of Figure 5.

Figure 8 is a longitudinal section through the body and cover of the power take-off plug shown in Figures 1, 2 and 3, showing these parts in separated position.

Figure 9 is an inside plan view of the body of the plug.

Figure 10 is an inside plan view of the cover of the plug.

Figure 11 is a transverse section through the plug taken on the line 11—11 of Figure 2.

Figure 12 is a perspective view of a modified form of power take-off plug.

Figure 13 is an enlarged view showing one pair of the connector prongs of the plug shown in Figure 12 connected to a bus bar.

Figure 14 is a plan view of another modified form of power take-off plug.

Figure 15 is a longitudinal section taken on the line 15—15 of Figure 14.

Figure 16 is a transverse section taken on the line 16—16 of Figure 14.

In the drawings, the reference character 20 indicates the floor of a building and the reference characters 21 beams of the ceiling of the building. At intervals on the floor of the building, there are located machines, such as 22, each adapted to be operated by electric power and provided with a controller 23 of any suitable type.

To support the bus bars which conduct electric power from the conductors, which lead from the power house, to various points within the building, we provide on the ceiling of the building a conduit or conduits 24 each extending from one end to the other of the building and each consisting of a plurality of sections 25 of convenient length. Preferably each section is of such length that it extends from center to center of a pair of the beams 21 and the abutting sections are secured to each other and to the adjacent beam 21 by means of a pair of angle plates 26, one located on each side of the conduit, each having a vertical flange overlapping the abutting ends of the two sections and secured to both and a horizontal flange secured to the beam 21.

Each conduit section includes a channel shaped housing 27 of suitable metal lined on its bottom and sides with sheets of insulating material, as indicated at 28 and 29, respectively. As shown in the drawings, the interior of the housing is divided into three compartments 30 by a pair of longitudinally extending partitions 31 of insulating material though it is to be understood that any desired number of these compartments 30 may be provided, depending upon the number of conductors to be provided in the housing. There are provided in each of the compartments 30 intermediate its ends a plurality of spaced bus bar supports 32 which, besides performing the function indicated by their name, also serve to maintain the partitions 31 in spaced relation. It will be noted that each of the bus bar supports in one of the compartments 30 is aligned transversely of the housing with a bus bar support in each of the other two compartments 30. Each of the bus bar supports 32 rests at one end on the sheet of insulating material 28 and at its opposite end terminates short of the open side of the housing. Extending into each of the supports 32 from its end adjacent the open side of the housing is a notch 33. In each of the compartments 30 and resting in the notches in the supports 32 therein is provided a bus bar 34 coextensive in length with the housing. Seated on each of the supports 32 and maintaining the bus bar in position therein is a cap 35. The bus bars of adjacent sections of the conduit are connected in any suitable manner as by fish plates 34', as shown in Figures 4 and 5.

Through the bottom of the housing, through the sheet 28 and through each of the three aligned bus bar supports 32 and caps 35 adjacent each end of the housing extends a pair of bolts 36 each of which is provided with a head engaging the outer side of the housing and on the opposite end of each of which is threaded a nut 37 whereby the bus bars are maintained in position within the housing.

Of the intermediate sets of aligned bus bar supports and caps, every other one is maintained in position in the housing in the same manner as the end ones. The remaining bus bar supports are maintained in position in the housing, as shown in Figure 6, by a rod 38 extending through the side walls of the housing, through the sheets 29, through each of the three aligned bus bar supports 32 and through the partitions 31 and provided on its opposite ends with nuts 39 bearing against the opposite sides of the housing. The caps 35 which maintain the bus bars in place in the notches in the bus bar supports are each secured to bus bar supports by a pair of screws 40.

The open side of the housing is closed by a cover 41 having therein openings through which the portions of the bolts 36 which extend beyond the nuts 37 extend and is held in place on the housing by nuts 42 threaded on the bolts.

Between each set of bus bar supports, there is provided on one side of each of the bus bars a pair of opposed contact roller housings 43 which are secured to the bus bar by any suitable means, such as the screws 44. In the opposed ends of each pair of housings are formed recesses 45 in each of which is located a contact roller 46. In each of the housings 43 and opening into the recess 45 is provided a recess 47 in which is located a coiled spring 48 which bears at its inner end against the rear wall of the housing and which extend at its outer end into a cup-shaped seat 49 which bears against the contact roller 46. It will be obvious that the pressure of the springs 48 urges the contact rollers of each pair into contacting relation. Directly below the line of contact between each pair of contact rollers, there is provided in the cover 41 an opening 50 adapted to be closed by a plug 51 which is adapted to prevent dust and dirt entering the conduit through the openings.

To conduct current from the conduit 24 to each of the machines 22, there is provided a cable 52 connected at one end to the controller 23 and connected at its other end to a power take-off plug 53 which is adapted to be removably attached to the conduit so as to electrically connect the cable and the bus bars in the conduit.

Each of the plugs 53 includes a body portion 54 having therein three longitudinally extending channels 55 which open through one end wall of the body but end short of the opposite end wall thereof. Through this latter end wall, three connector prongs 56 extend, one of which enters each of the channels 55. Within each channel, there is formed on the end of the connector prong therein a contact block 57 into which extends a screw 58 which secures the prong to the body. Adjacent the opposite end of each of the channels 55, there is provided a second contact block 59 secured to the body by means of a screw 60. To each of these blocks 59 is connected a metal strip 61 which extends through the body into a housing 62, detachably secured to the outside thereof by means such as the screws 63. Within the housing 62 each of the strips 61 is provided with means, such as that indicated by the reference character 64, whereby one of the wires 65 of the cable 52, which enters the housing through the neck 67 and the opening 66, may be connected thereto.

The cover 68 is detachably secured to the body by means of the screws 69 and is provided on its inner face with channels 70 adapted to register with and complement the channels 55 when the cover is in position on the body. In each of the channels 70 at points opposite each of the blocks 57 and 59 there is provided a plate 71 secured to the cover by means of the screws 72. Through each of the plates is threaded a screw 73, which extends at its outer end into an opening through the cover. On the inner end of each of the screws 73 and in a position to engage the corresponding contact block on the body of the plug when the body and cover are secured together is loosely secured a contact block 74. Each of the screws 73, it will be noted, is provided on its outer end with a slot by means of which it may be engaged by a screw driver to rotate it to move the block 74 toward or away from the block 57 (or 59).

The blocks 57 and 59 are electrically connected by fuses 75 which are held firmly in position thereon by the blocks 74. Between each pair of screws 73 there are provided openings 76, closed by sheets of transparent material, so that it may readily be observed whether or not a fuse has been blown.

Removably secured to both the body and the cover of the plug 53 are a pair of spring catches 77 which extend beyond the same end of the body of the plug as the prongs 56. On each of the catches 77 is provided a projection 78 adapted to enter a notch 79 formed in the side of the housing adjacent each set of contact rollers to secure the plug removably in position on the conduit.

To electrically connect the one of the machines 22 to the bus bars in the conduit, the plugs 51 in the nearest openings 50 in the cover are removed and the prongs of the plug inserted through the openings and between the pairs of contact rollers. When the prongs are in this position, the projections 78 on the catches 77 will engage in the notches 79 on the housing or the conduit and maintain the plug securely in position until it is desired to remove it.

It will be noted that the connector prongs on the plug are unequally spaced transversely thereof and that the openings in the cover of the conduit and the pairs of contact rollers on the bus bars are likewise spaced unequally transversely of the conduit, so that it is impossible to position the prongs between the wrong pairs of contact blocks when connecting the plug to the conduit. It will also be noted that when the prongs enter between the pairs of contact rollers they will cause rotation thereof and insure a fresh point of contact and therefore a good electrical connection each time the plug is connected to the conduit.

It is contemplated that each of the pieces of apparatus on the floor of the building will be provided with cables and plugs, such as those hereinbefore described. When a particular piece of apparatus is not in use, the electric connection between the machine and the conduit will be broken by detaching the plug from the conduit so that there will be no danger of anyone working around the machine being electrocuted or harmed by accidental starting of the machine. When it is desired to supply electric power to any machine, it is only necessary to plug it into the conduit, as previously described. It will be obvious that our system provides a very flexible means for the distribution of electric power since one of the plugs can be connected to the conduit at practically any point in its length so that power can be withdrawn from the conduit at practically any desired point.

The power take-off plug shown in Figures 12 and 13 is similar to that previously described with the exception of the connector prongs 80. Each of the prongs 80 includes two strips 81 of spring metal secured together at their inner ends within the plug and formed on their outer ends with opposed cylindrically shaped seats 82 each in extent greater than half a cylinder. In each of the seats is located a cylindrical contact roller 83. As can be seen in Figure 12 the resiliency of the strips normally holds the pair of contact rollers together.

When the type of contact prongs shown in Figures 12 and 13 is used, the contact rollers and housings on the bus bars are not necessary since, when the prongs are inserted through the holes in the cover of housing, the pair of contact rollers on each of the prongs will engage on opposite sides of a bus bar and upon further upward movement of the block will move to positions on opposite sides of the bus bar as shown in Figure 13, clamping the bar firmly between them. As the pair of rollers move upwardly on the bar, they roll on the opposite sides of the bar which makes it much easier to insert the prongs and also insures a fresh point of contact and a good electrical connection each time the plug is connected to the conduit.

The plug shown in Figures 14–16 consists of a body portion 84 having therein three longitudinally extending channels 85 closed at one end by the end wall of the body and closed at their opposite ends by a removable plate 86. Through the former end wall and into each of the channels extends a connector prong 87 which is secured to the body by means of a screw 88. On the outer side of the body at the end distant from the prongs is formed a compartment 89 which is open on its outer side. Three contact blocks 90 are moulded in the body of the plug, each extending into one of the channels 85 and all extending at their opposite ends into the compartment 89. Into the ends of each of the blocks 90 which extend into the compartment 89 extends a threaded bore into which is screwed a screw 91 by means of which a wire 92 may be connected to each of the blocks. The open side of the compartment 89 is closed by a removable plate 93 in which is provided an opening in which is secured an elbow 94 through which the wires 92 may be led to the outside of the plug.

The cover 95 is removably secured to the body of the plug by screws, such as 96, which are threaded into sleeves 97 moulded into the body of the plug and is provided opposite each of the ends of the prongs 87 within the channel and opposite each of the contact blocks 90 with a sleeve 98 moulded into the material of the cover and having therethrough a threaded bore. Threaded through each of the sleeves 98 is a screw 99 on the inner end of which is loosely secured a contact block 100. The outer end of each of the screws 99 is provided with a cross slot by means of which it may be engaged by a screw driver from the outside of the plug to move the blocks 100 toward or away from the ends of the prongs (or the contact blocks).

To provide an electrical connection between the ends of the prongs within the channels and the corresponding blocks 90, there is provided in each of the channels 86 a fuse 101 clamped to the prongs and the blocks 90 by means of the blocks 100 carried by the screws 99. An opening, such as 102, closed by a transparent sheet 103 is provided through the cover between each pair of screws so that it can be easily observed whether or not the fuse has been blown.

For securing the plug to the side of the conduit, there is provided on each side of the plug a spring catch 104 having thereon a projection 105 adapted to enter into a notch 79 on the side of the conduit.

The apparatus hereinbefore described has several outstanding advantages, not previously mentioned, over the apparatus previously used for similar purposes. It will be obvious that main line conductors of somewhat smaller cross-sectional area can be employed to carry a given current with a consequent economy of material, when they are supported in a conduit with relatively large air spaces separating them, than when they are carried in the cables ordinarily used. Another distinct advantage of our system is that the main line conductors are continuous throughout their length, even at the points at which they are arranged to be connected to branch conductors, which results in a saving of the time and expense ordinarily necessary to make joints and install connectors, and eliminates the possibility of weak joints and possible breakage of the conductors with the consequent inconvenience and danger.

The location of separate fuses for each machine in the plug connecting the machine to the main line conductors prevents blowing out of the main line fuse when a single machine is overloaded. The fuses in each plug may be easily inspected through the openings provided in the plug for that purpose and may be easily and quickly replaced when necessary either by loosening the clamping screws holding them in place, removing the old fuses through the open ends of the channels in the plug, inserting new fuses through the open ends of the channels and securing them in place by means of the clamping screws, or by removing the cover entirely from the body of the plug, removing the old fuses, putting in new fuses and replacing the cover on the body of the plug.

Though we have shown and described preferred embodiments of our invention, it is to be understood that this has not been done with the intention of limiting our invention thereto but merely by way of example and that the scope of our invention is limited only by the appended claims.

We claim:

1. In an electric distribution system, a continuous conductor, a pair of opposed housings secured to the conductor between its ends, contact rollers in the adjacent sides of the housings, resilient means urging the contact rollers toward each other, and a connector plug having a prong adapted to be inserted between the contact rollers.

2. In a device of the class described, a conduit including a channel-shaped housing, an insulating lining for the bottom and sides of the housing, a plurality of longitudinally extending insulating partitions dividing the housing into a plurality of compartments, longitudinally spaced elements in each compartment, each of the elements having in its end adjacent the open side of the housing a notch for the reception of a bus bar, a bus bar in each of the compartments seated in the notch in each of the elements in that compartment, caps for maintaining the bus bars in the notches, bolts extending through the bottom of the housing, through the elements, and through the caps, means on each bolt to secure the elements, the bus bars, and the caps in the housing, a cover for closing the open side of the housing having therethrough openings through which the portions of the bolts extending beyond the above-mentioned means extend, and means on the bolts to secure the cover to the housing.

3. In a power take-off plug having therein a longitudinally extending channel, a connector prong extending at one end into the channel, a connector block adjacent the opposite end of the channel, and means to secure a conductor between the prong and the block including a screw threaded through the plug and operable from the outside of the plug for moving the screw toward and from the block.

4. In an electric distribution system, a conductor, a detachable plug for connecting a second conductor to the first-mentioned conductor, including prongs carrying roller contact members adapted to be projected onto opposite sides of the first-mentioned conductor so as to detachably connect the first-mentioned and second-mentioned conductors.

5. In apparatus of the class described, a substantially rigid conductor, a housing secured to and electrically connected to the conductor, a contact roller, an element provided with a curved seat for the roller carried by and electrically connected to the housing, a second contact member carried by the conductor in opposed relation to the roller, and a resilient member carried by the conductor and urging the element and the contact roller toward the second contact member.

6. The invention claimed in claim 5 in which the second contact member includes a contact roller arranged similarly to and in opposed relation to the first-mentioned contact roller.

7. In an electric distribution system, a substantially rigid extended conductor, a movable contact member on said conductor between its ends, resilient means on said conductor operatively associated with said contact member, a connector plug including a prong adapted to engage the contact member, and means other than the resilient means electrically connecting the plug and the conductor when the plug is in engagement with the contact member.

8. In an electric distribution system, a substantially rigid extended conductor, opposed contact members on said conductor between its ends, means on said conductor yieldingly urging said contact members toward each other, a connector plug having a prong adapted to be inserted between the opposed contact members, and means other than the first mentioned means electrically connecting the plug and the conductor when the prong is in engagement with the contact members.

9. In a power take-off plug, a body having a connector prong and a connector block insulated and spaced from the prong, a cover for enclosing the connector prong and the block, means securing the cover to the body, and means movable relatively to and carried by the cover for detachably securing a conductor to the prong and to the block.

10. In an electrical distribution system, a plurality of extended conductors, a power take-off plug having contact prongs adapted to be detachably connected to the conductors, and means on the conductors between their ends for readily connecting the prongs to the conductors, said means comprising pairs of revoluble members between each of which pairs of members a prong is adapted to be inserted to detachably connect the plug and the conductor.

11. In an electrical distribution system, substantially rigid extended conductors, movable contact members on each conductor between its ends, resilient means on each conductor adjacent said contact members, a connector plug having prongs adapted to move the contact members against the resistance of the resilient means when the prongs are forced into contact with the contact members, and means other than the resilient means electrically connecting the plug and the conductor when the plug is in engagement with the contact members.

12. In combination with an extended electrical conductor, a terminal mounted on the conductor between its ends and comprising a rotatably-mounted contact element, and a connector plug adapted to be detachably connected to the conductor and including a terminal adapted to engage said contact element so as to detachably connect the plug and the conductor.

13. In an electrical distribution system, an extended current-conducting member, and a plug member adapted to be detachably connected to the conducting member between its ends, one of said members having a resiliently-urged rotatably-mounted contact member and the other member having a portion adapted to make electrical contact with said contact member so as detachably to connect the plug and the member.

14. In an electrical conduit, an elongated housing, a partition of insulating material extending longitudinally within the housing, a transversely extending spacing element of insulating material on each side of said partition, and fastening means extending transversely through the housing, the longitudinal partition and the transverse spacing elements.

15. An electrical conduit comprising a channel-shaped housing; transversely extending spacing elements of insulating material within the housing; each of said spacing elements having a notch in the edge adjacent the open side of the housing; an extended conductor seated in the notches of said spacing elements; a cap member of insulating material abutting said edge of each of said spacing elements for maintaining the conductor in the notch; fastening means extending through the bottom of the housing, the spacing elements and the cap members; means on said fastening means securing the cap members and spacing elements in the housing; a cover closing the open side of the housing and having openings through which said fastening means extend; and means on said fastening means securing said cover to the housing.

16. An electrical conduit comprising an elongated housing, a longitudinally extending partition within the housing, a transversely extending spacing element on each side of said partition, transversely extending means securing the partition and spacing elements to the housing, other transversely extending spacing elements longitudinally spaced from the first-mentioned spacing elements, the spacing elements on each side of the partition having alined notches, conductors in the alined notches, cap members associated with the spacing members for maintaining the conductors in position, and means securing the second-mentioned spacing members to the housing.

17. In apparatus of the character described, a substantially rigid conductor, and a power take-off plug which is adapted to be detachably connected to the conductor and includes a prong having divergent free ends resiliently urged toward each other and carrying opposed contact rollers which are adapted to engage opposite sides of the conductor to detachably electrically connect the power take-off plug thereto.

18. A power take-off plug which consists of a body of insulating material in which there is provided a channel, a contact prong having a portion located within the channel and secured to the body, a contact block located within the channel at a distance from the prong and secured to the body, and a second body of insulating material secured to the first body, closing the open side of the channel and maintaining a conductor in contact with the prong and the block.

19. A power take-off plug which consists of a body of insulating material in one side of which there are provided a plurality of channels, and on the opposite side of which there is provided an enclosure into which conductors are adapted to be lead, a plurality of contact prongs of which each has a portion located within one of the channels, and conducting elements extending from each of the prongs into the enclosure so that the prongs may be electrically connected to the conductors.

20. A power take-off plug which includes a body of insulating material in one side of which there are provided a plurality of channels and on the opposite side of which there is provided an enclosure into which conductors are adapted to be lead, a plurality of contact prongs of which each has a portion located within one of the channels, a contact block located within each of the channels at a distance from the prong, conducting elements extending from each of the prongs into the compartment, and means for securing a conducting element in contact with each of the prongs and the corresponding block.

CARL A. GERLACH.
WILBUR E. SANDERS.